(12) United States Patent
Bensen

(10) Patent No.: US 10,244,864 B2
(45) Date of Patent: Apr. 2, 2019

(54) DEVICE AND SYSTEM FOR JOINING OBJECTS

(71) Applicant: PABensen Pte. Ltd., Singapore (SG)

(72) Inventor: Peter Arnoud Bensen, Singapore (SG)

(73) Assignee: PABensen Pte. Ltd., Singapore (SG)

( * ) Notice: Subject to any disclaimer, the term of this patent is extended or adjusted under 35 U.S.C. 154(b) by 6 days.

(21) Appl. No.: 15/124,952

(22) PCT Filed: Mar. 10, 2015

(86) PCT No.: PCT/SG2015/000070
§ 371 (c)(1),
(2) Date: Sep. 9, 2016

(87) PCT Pub. No.: WO2015/137876
PCT Pub. Date: Sep. 17, 2015

(65) Prior Publication Data
US 2017/0020282 A1    Jan. 26, 2017

(30) Foreign Application Priority Data

Mar. 10, 2014  (SG) .............................. 10201400516S

(51) Int. Cl.
*A63H 33/08*  (2006.01)
*A47B 47/00*  (2006.01)
(Continued)

(52) U.S. Cl.
CPC ........ *A47B 47/0016* (2013.01); *E04B 1/1912* (2013.01); *E04B 1/5831* (2013.01); *F16B 5/0084* (2013.01); *F16B 5/123* (2013.01); *F16B 7/00* (2013.01); *F16B 7/04* (2013.01); *F16B 9/02* (2013.01); *F16B 12/24* (2013.01);
(Continued)

(58) Field of Classification Search
CPC ..... A63H 33/08; A63H 33/082; A63H 33/105
USPC ........ 248/210, 235, 238; 446/124, 125, 126, 446/127
See application file for complete search history.

(56) References Cited

U.S. PATENT DOCUMENTS 5,803,782 A    9/1998  Selton
5,941,527 A *  8/1999  Selton ................. A63F 3/00214
                                             273/160
(Continued)

FOREIGN PATENT DOCUMENTS

EP    1992252 A1    11/2008

OTHER PUBLICATIONS

SINGH, Parminder; "International Search Report" prepared for PCT/SG2015/000070 dated Aug. 24, 2015; 4 pages.

*Primary Examiner* — Steven M Marsh
(74) *Attorney, Agent, or Firm* — Winstead PC

(57) ABSTRACT

A joint assembly comprising; an engagement block having a plurality of insert receiving faces; each insert receiving face having a slot, and an aperture at a mid-point of said slot; a plurality of inserts each having a core, at least a pair of ribs projecting from said core, a coupling at an insertion end of the core and a mount at a mounting end of the core, and; a coupling pin; wherein said engagement block is arranged to receive the inserts, with said ribs received into the slots and said core received into said aperture, said coupling pin arranged to be inserted into said engagement block and couple with the couplings of said inserts so as to releasably fix the inserts to the engagement block.

20 Claims, 14 Drawing Sheets

(51) Int. Cl.
*F16B 7/04* (2006.01)
*F16B 9/02* (2006.01)
*F16B 12/24* (2006.01)
*F16B 12/46* (2006.01)
*E04B 1/19* (2006.01)
*E04B 1/58* (2006.01)
*F16B 5/00* (2006.01)
*F16B 5/12* (2006.01)
*F16B 7/00* (2006.01)
*A47B 73/00* (2006.01)

(52) U.S. Cl.
CPC .............. *F16B 12/46* (2013.01); *A47B 73/00* (2013.01); *E04B 1/585* (2013.01)

(56) References Cited

U.S. PATENT DOCUMENTS

| | | | |
|---|---|---|---|
| 6,378,265 B1* | 4/2002 | Konstandt | E04B 1/1903 403/171 |
| 8,726,583 B2* | 5/2014 | Verdecia | E04B 1/24 52/126.1 |
| 9,308,464 B1* | 4/2016 | Torres | A63H 33/044 |
| 9,579,589 B1* | 2/2017 | Lee | A63H 33/105 |
| 9,829,022 B2* | 11/2017 | Su | F16B 7/0413 |

* cited by examiner

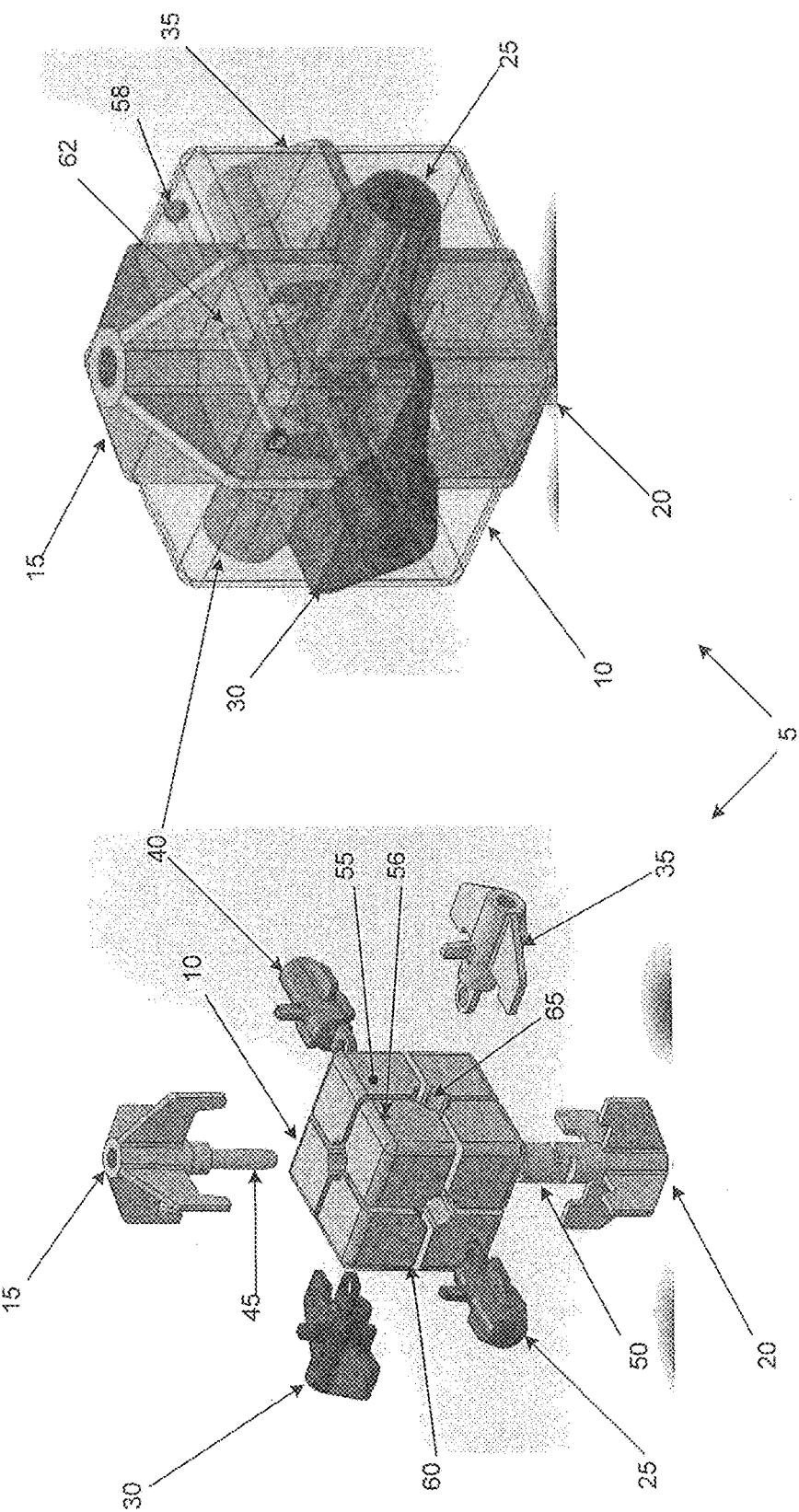

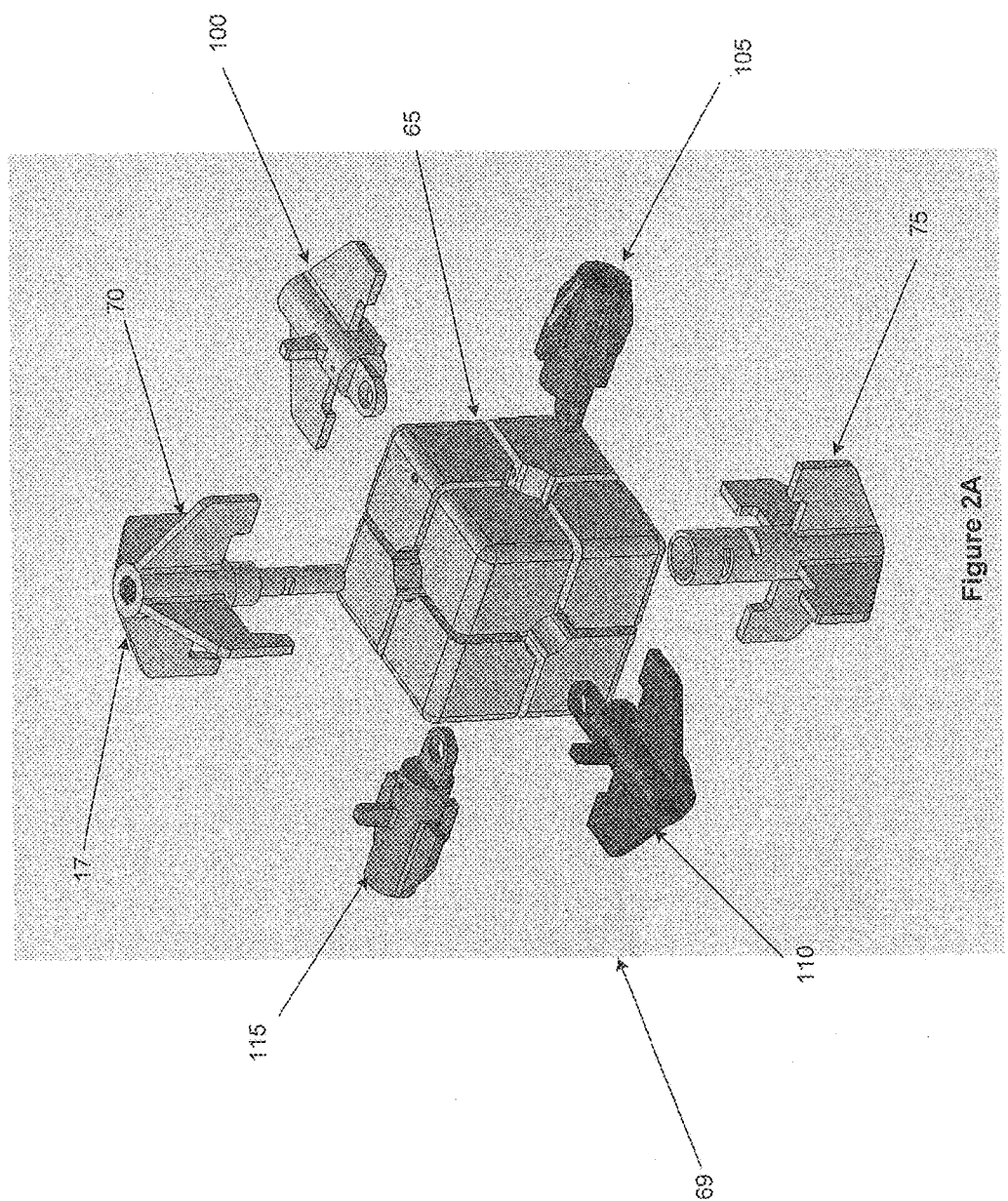

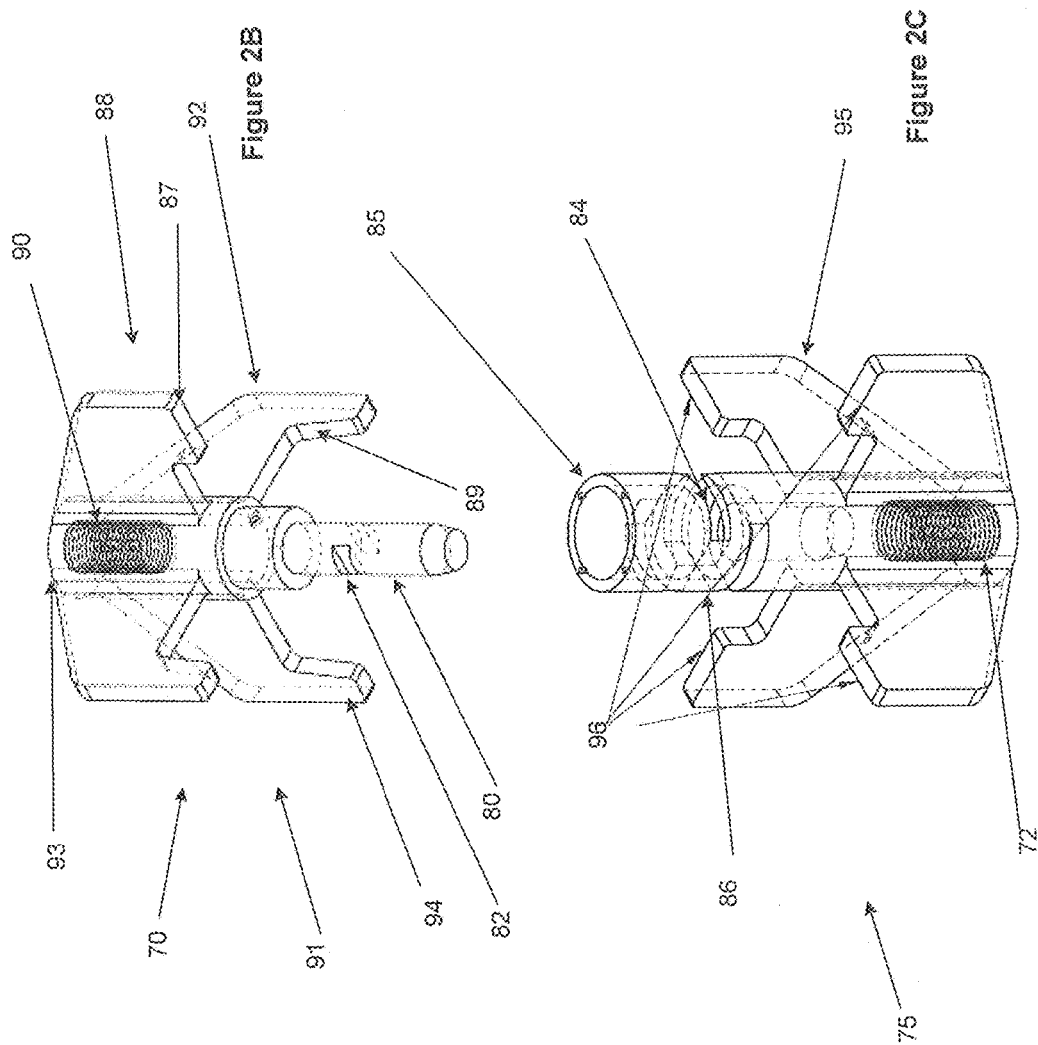

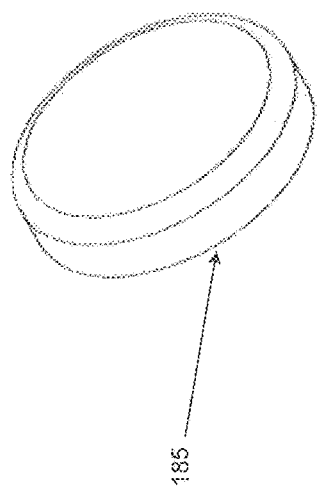
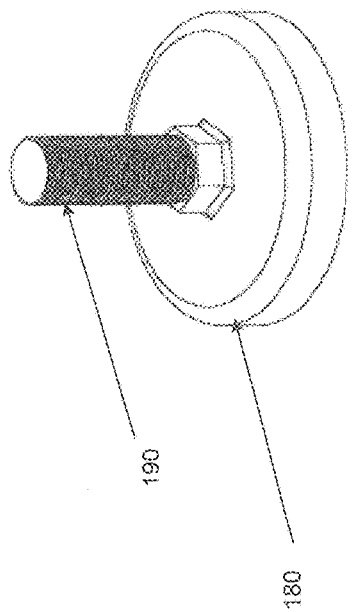
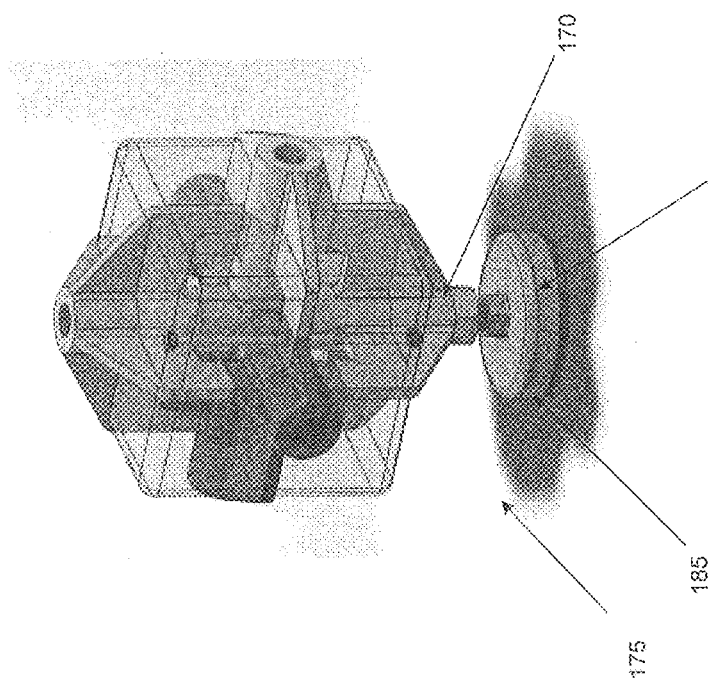

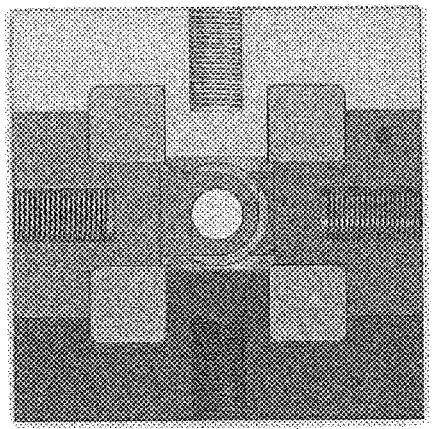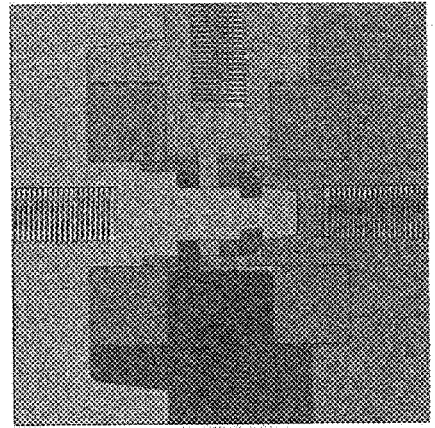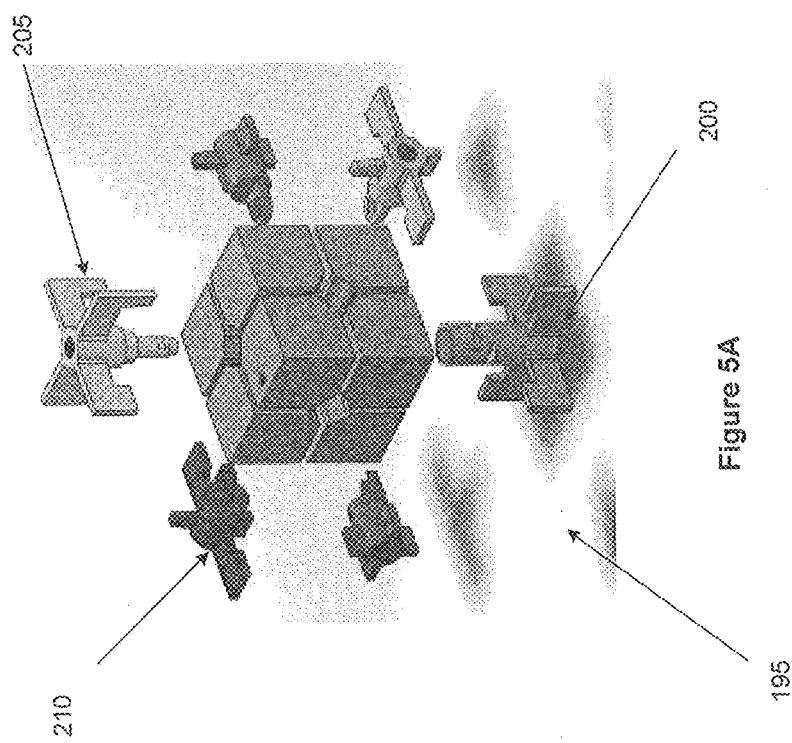

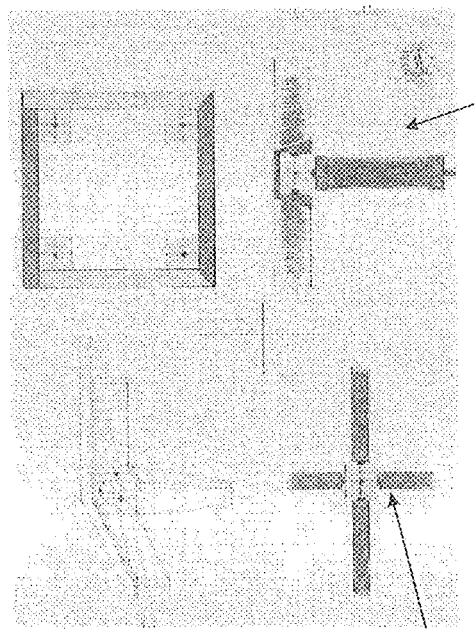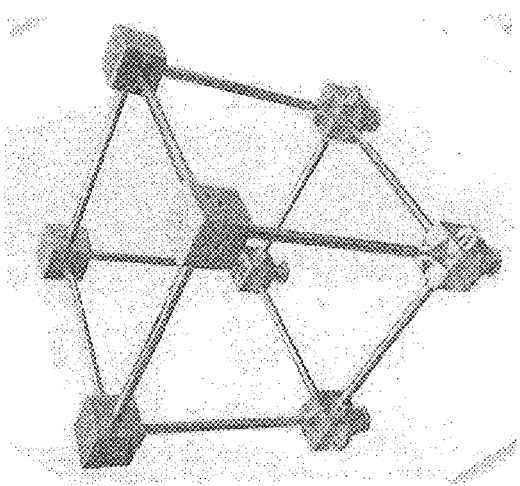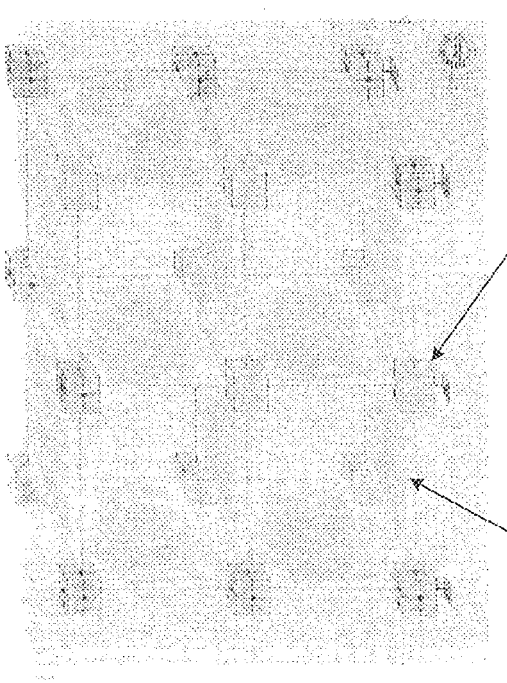
Figure 6A
Figure 6B
Figure 6C

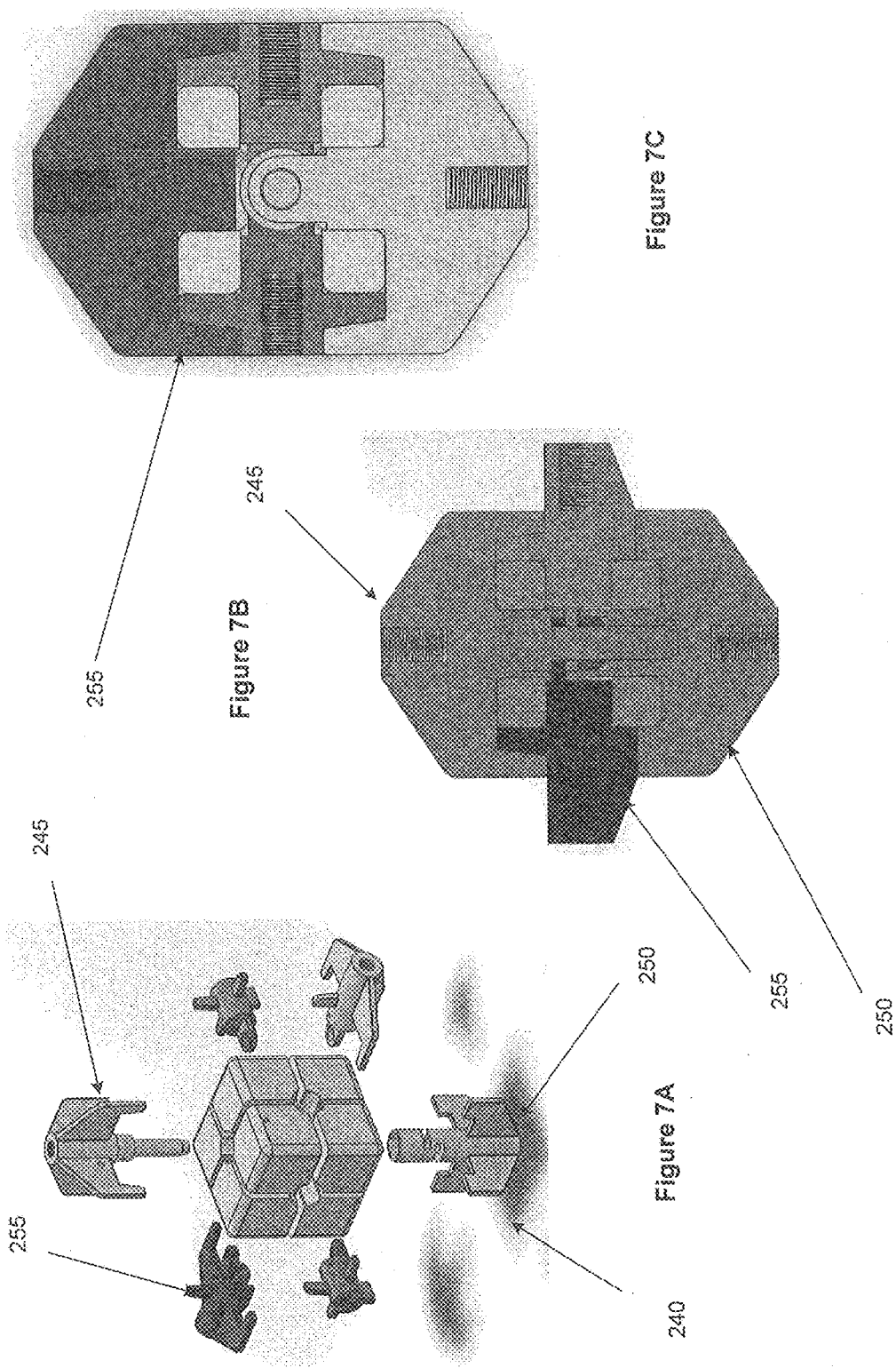

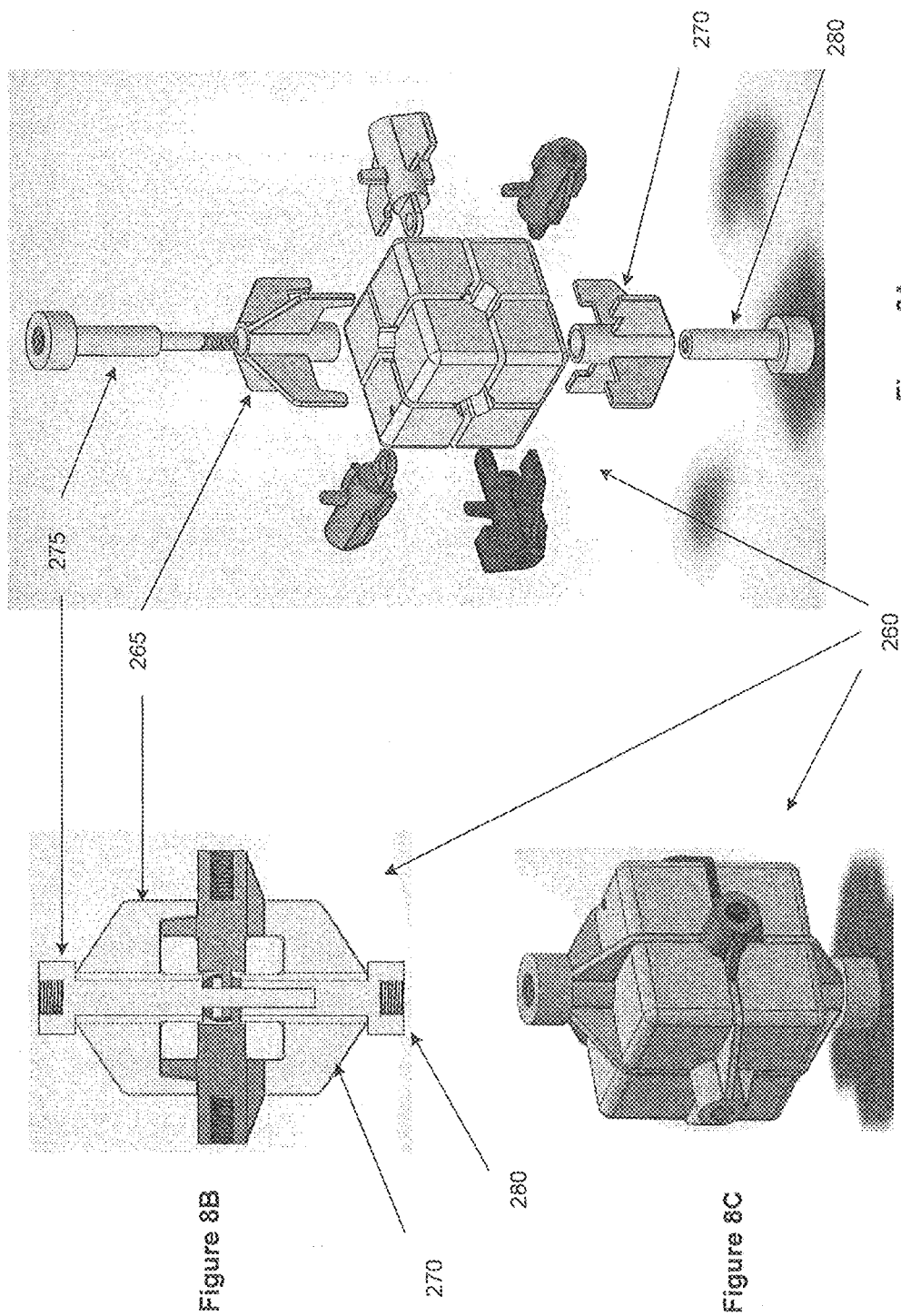

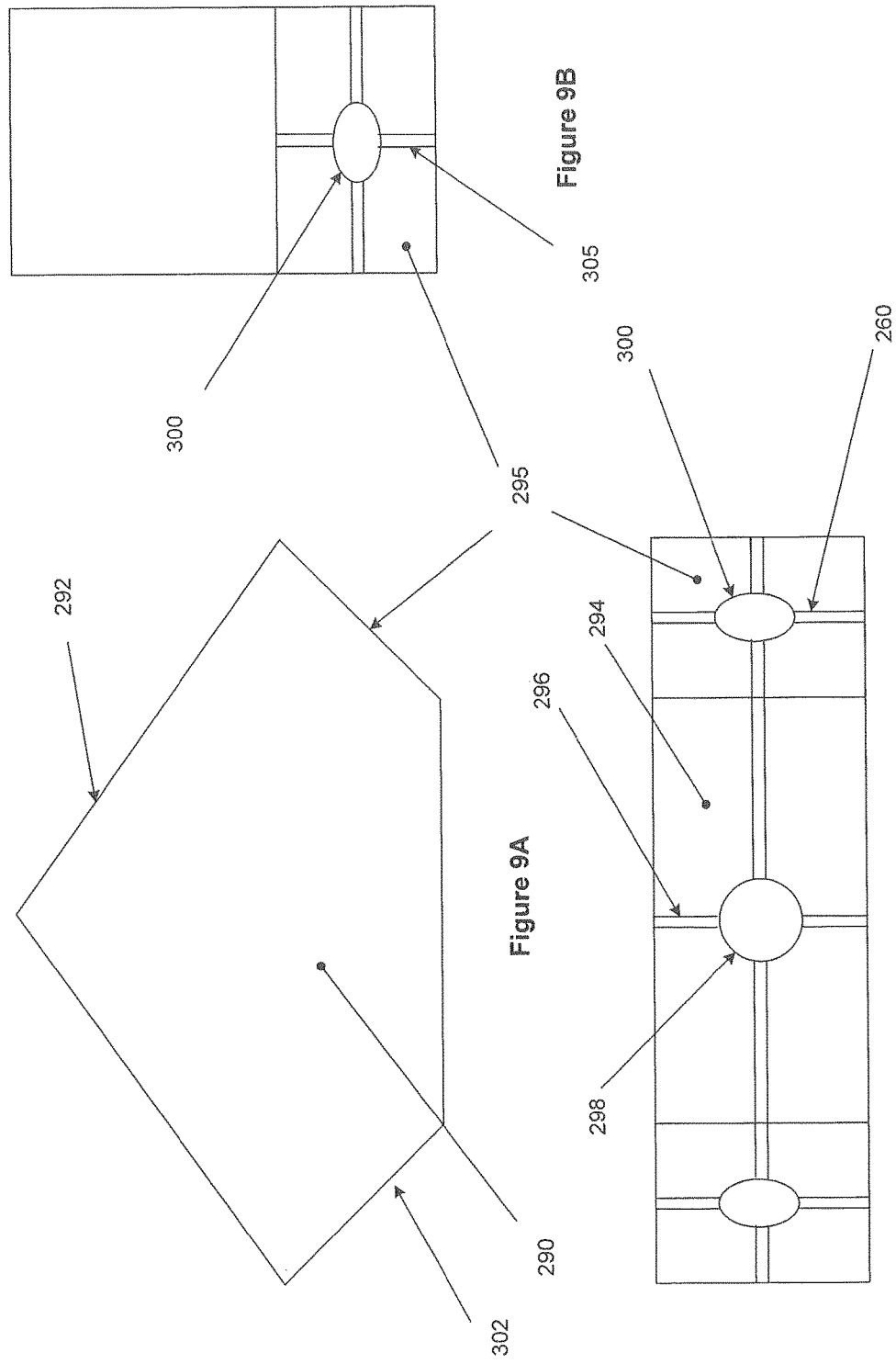

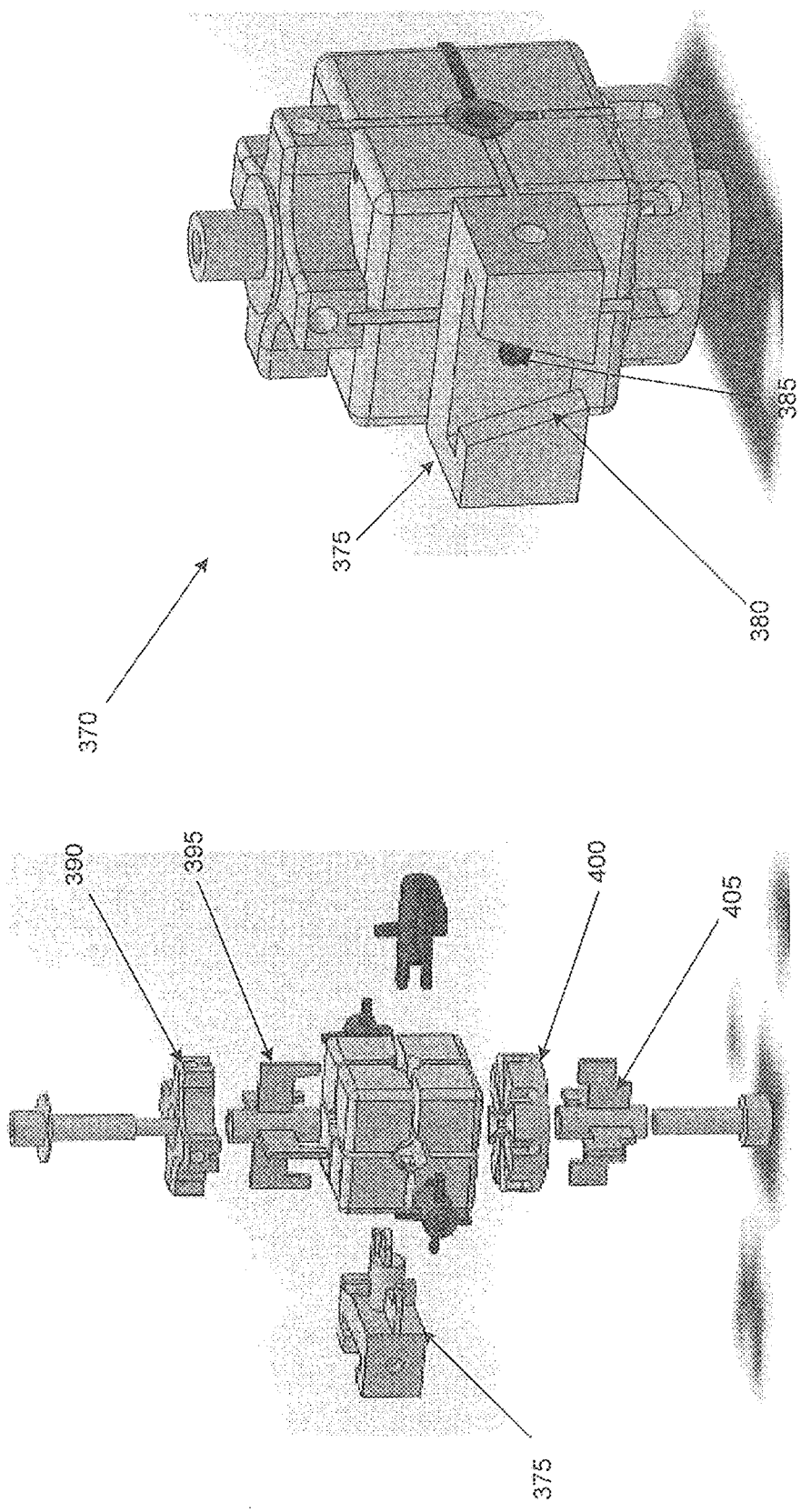

DEVICE AND SYSTEM FOR JOINING OBJECTS

FIELD OF THE INVENTION

The invention relates to the assembly of structures based upon modular components. In particular, the invention relates to a joint assembly having the capability to rapidly assemble structures including furniture, temporary construction, modular residential houses and semi-permanent scaffolding.

BACKGROUND

The use of modular construction particularly for temporary structures or non-structural applications requires rapid assembly in order to meet economic milestones. Where a structure requires a structural frame that not only needs to be assembled quickly, but also disassembled, at best requires threaded members to be inserted into joint assemblies often by unskilled labour on scaffolding or ladders.

It would be advantageous if a quick release system were available that could be applicable for medium non-structural articles as well as scalable to large semi-permanent and structural applications.

SUMMARY OF INVENTION

In a first aspect, the invention provides a joint assembly comprising; an engagement block having a plurality of insert receiving faces; each insert receiving face having a slot, and an aperture at a mid-point of said slot; a plurality of inserts each having a core, at least a pair of ribs projecting from said core, a coupling at an insertion end of the core and a mount at a mounting end of the core, and; a coupling pin; wherein said engagement block is arranged to receive the inserts, with said ribs received into the slots and said core received into said aperture, said coupling pin arranged to be inserted into said engagement block and couple with the couplings of said inserts so as to releasably fix the inserts to the engagement block.

Accordingly, the invention provides for an engagement block which can receive inserts mountable to members whether the members be structural or otherwise. By providing the coupling pin, alignment of external members with the engagement block is readily achieved by mounting to the inserts into the slots. These are then quickly fixed equally released by removal of the various locking arrangement, such as the coupling pin, locking pin or forked minor insert, subject to the particular embodiment.

The engagement block may be cube shaped, or alternatively shaped to fit the desired application On insertion the inserts may be flush with the insert receiving face, and so have the aesthetic appeal of a clean surface, as well as being able to fit rectilinear structures more easily. Alternatively, the mounts of the inserts may project from the insert receiving face, so as to provide easier access to said mounts. In such cases, the mounts may include braces so as to support the projected length of the mount.

The coupling pin may be a separate item, which may also be the last piece inserted into the engagement block to secure the inserts in place. Alternatively, the joint assembly may include an insert having the coupling pin integrally fixed to the insert. The connector may also be a separate item, or alternatively, integrally mounted to an insert.

In one embodiment, the joint assembly may include accessories mounted intermediate the mounts and external members so as to provide varying angles for said members to project. For instance, one accessory may be frusto-pyramidal, having mounts on a plurality of included surfaces.

In a further embodiment, an accessory may include a load cell for providing force data at the joint from the external member. Alternatively, said member may include a strain gauge to provide force data.

The joint assembly may include a base as an accessory. Said base may further include a dampener for dampening vibration from a supporting surface upon which the base is placed. Said base may also include a load cell for providing reaction forces at said base.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

FIGS. 1A and 1B are isometric views of a joint assembly according to one embodiment of the present invention;

FIGS. 2A is an isometric view of a joint assembly according to a further embodiment of the present invention;

FIGS. 2B to 2G are isometric views of inserts for use with the joint assembly of FIG. 2A;

FIGS. 4A to 4C show a base support for a joint assembly according to a further embodiment of the present invention;

FIGS. 5A to 5C are various views of a joint assembly according to a further embodiment of the present invention;

FIGS. 6A, 6B and 6C are various views of structures constructed using a joint assembly according to a further embodiment of the present invention;

FIGS. 7A to 7C are various views of a joint assembly according to a further embodiment of the present invention;

FIGS. 8A to 8C are various views of a joint assembly according to a still further embodiment of the present invention and;

FIGS. 9A to 9C are various views of a gable joint assembly according to a one embodiment of the present invention;

FIGS. 11A to 11C are various views of a joint assembly with accessories according to a further embodiment of the present invention.

DETAILED DESCRIPTION

Figure 2E:
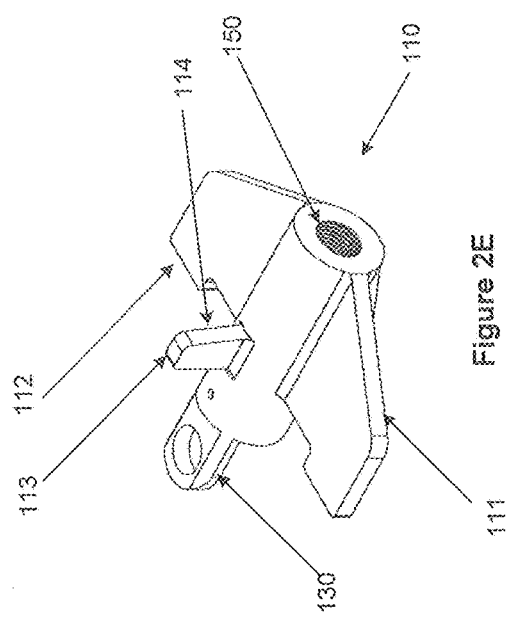

FIGS. 1A and 1B show a joint assembly 5 according to one embodiment of the present invention.

Here an engagement block 10, in this case cube shaped, receives a plurality of inserts 15, 20, 25, 30, 35, 40 in each of the 6 insert receiving faces 55 of the engagement block 10.

In this embodiment a primary insert 15 includes an integrally mounted coupling pin 45 and a secondary insert 20 having an integrally mounted connector 50 for receiving the coupling pin 45 as the primary 15 and secondary 50 inserts are inserted into the block 10 on opposed faces.

Each of the insert receiving faces 55 include slots 60 at right angles to each other with an aperture 65 at the intersection. This is to receive the inserts, each of which have a core for inserting into the aperture and ribs projecting from the core and corresponding to the slots.

This is a first major departure from the prior art which include a central joint into which the structural members are directly screwed into place. Thus, to release a structure at a joint each individual member would need to be individually unscrewed.

In this embodiment, the order of insertion starts with the secondary insert 20, followed by the minor inserts 25, 40 then the intermediate inserts 30,35 each of which placing the respective coupling through gaps in the connector 50 of the secondary insert. Finally the primary insert 15 with coupling pin is inserted into the engagement block 10 and into the connector through the couplings of the various inserts. As will be described later, inclined faces on the primary insert combines inclined faces of the intermediate and minor inserts, binding the inclined faces and acting to bind together the inserts and block. Finally a locking pin (not shown) is inserted into the locking hole 56 which passes through a rib of the primary insert, locking all inserts securely together.

For the present invention, releasing the coupling pin 45 from the connector 50 immediately releases each of the inserts and so in one movement the joint assembly is disassembled only requiring collection of the inserts from the members at a more convenient place and time. It will be appreciated that the inserts may permanently be connected to the members if frequently used with the system according to the present invention. A further degree of security is provided in the embodiment of FIGS. 1A and 1B. Here a locking pin 58 is provided which inserts into a locking recess 56 which corresponds to a hole 62 in the primary insert 15. On insertion of the locking pin and through the lateral projection, or rib, of the insert, the primary insert cannot be removed whilst the locking pin is in place.

FIG. 2A shows a further embodiment of the joint assembly according to another embodiment of the present invention. FIGS. 2B to 2G show various inserts used with respect to the embodiment of FIG. 2A. FIG. 2B, in particular, shows a primary insert 70 having a plurality of ribs 88, 91 projecting from a core 93. At one end of the core 93 is a mount 90 which in this case is threaded to receive an external member (not shown).

Three of the ribs 91 include tips 94 having inclined internal surfaces 89. One rib 88, however, does not include a tip but instead a perpendicular surface 87. Projecting from the core at an opposed end to the mount 90 is a coupling pin 80 having a pair of voids 82 on either side of the coupling pin.

FIG. 2C shows a secondary insert 75 having four ribs 95 projecting from a central core with each rib having a perpendicular surface 96. As with the primary insert 70 the secondary insert includes a mount 72 at one end of the core and a connector 85 at an opposed end of the core. The connector 85 is arranged to receive the coupling pin 80 of the primary insert 70.

In the wall of the connector is a plurality of gaps 84 aligned with each of the ribs.

Figure 2G:
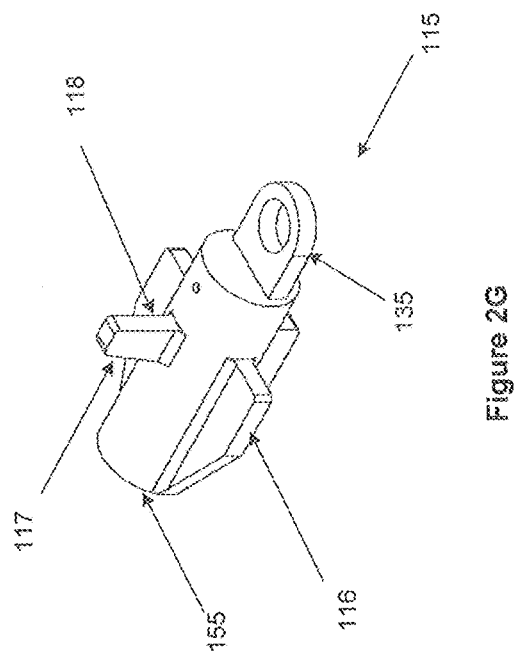
Figure 2D:
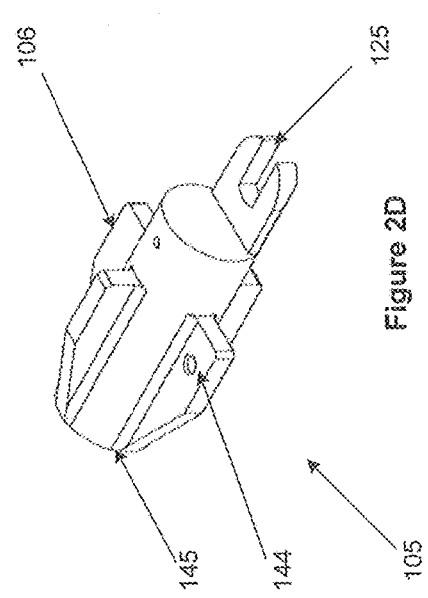
Figure 2F:
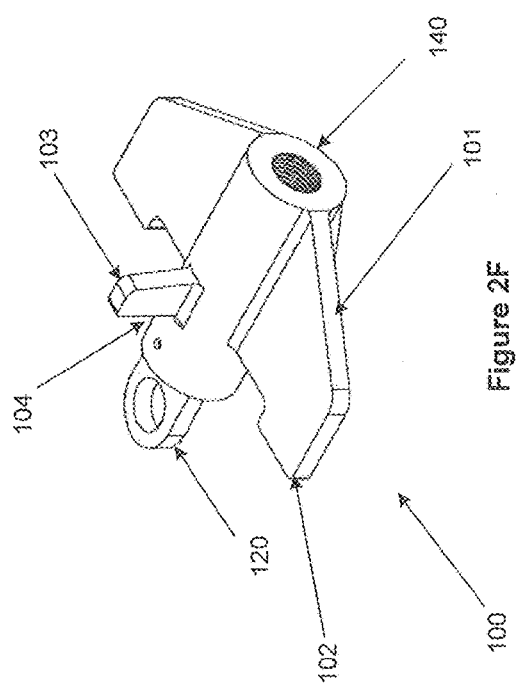

FIGS. 2E and 2F show two intermediate inserts 100, 110 having ribs 101, 111 and perpendicular surfaces 102, 112 projecting from a core. At one end of the core is a mount 140, 150 and at opposed end is a coupling 120, 130. The intermediate insert 100, 110 are essentially identical except for the position of the coupling 120, 130 relative to the core.

FIG. 2G includes a minor insert 115 also having a mount 155 at one end of the core and a coupling 135 at an opposed end and having minor ribs 116 projecting from that core.

Each of the inserts 100, 110, 115 further includes tips 103, 113, 117 each having inclined surfaces 104, 114, 118.

FIG. 2D shows a forked minor insert having three minor ribs 106 projecting from the core, and having a mount 145 at one end of said core. Each minor ribs include a perpendicular surface arranged to allow siding against corresponding perpendicular surfaces 87, 96 of the primary and secondary inserts 70,75. At the opposed end of the core is a forked projection 125. In one of the ribs is a hole 144 for accommodating a locking pin.

Referring back to FIG. 2A the order in which the inserts are inserted into the block is determined by the various features of those inserts. The order commences with the secondary insert 75 inserted therein' followed by the intermediate inserts 100, 110 and the minor insert 115. Then the primary insert is inserted with those ribs 91 having tips 94 positioned so as to engage the inclined surfaces 89 of the primary insert 70 with the inclined surfaces of the intermediate and minor inserts 104, 114, 118. This is particularly important as the application of force on the primary insert applies a binding force between the various inclined surfaces providing a preload to the surfaces. On withdrawing the primary insert moves the insert along the primary axis leading to the inclined surfaces springing from each other aiding in the rapid release of the joint assembly.

The last insert is that of the minor forked insert which aligns along the axis of the rib 88 having the perpendicular surface 87 of the primary insert 70. The forked coupling 125 then enters the gap in the connector and enters into sliding engagement with the voids 82 on either side of the coupling pin 80. Thus the forked minor insert provides a final lock preventing the extraction of the primary insert from the engagement block. The final step in locking the joint assembly is the insertion of the locking pin through the locking hole which passes through the hole 144 of the forked minor insert.

Figure 3B:
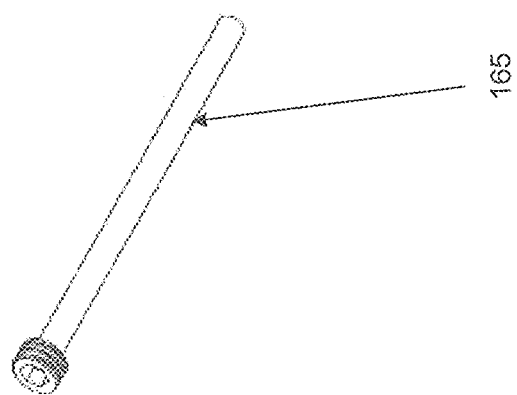
FIGS. 3A and 3B show a locking pin according to one embodiment of the present invention.
Figure 3A:
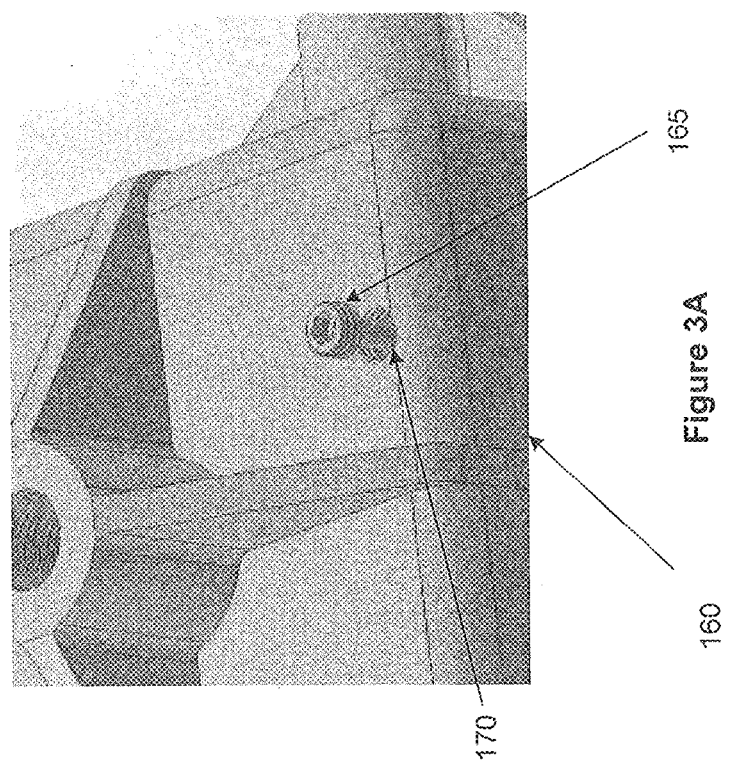

FIGS. 3A and 3B show a further embodiment of the locking pin 165 which in this case is in screw thread engagement with the engagement block 160 through the screw threaded recess 170.

In a further embodiment, a joint assembly 175 may include a base support 180 which, through a screw thread 190, may mount to an insert through the insert mount 170. The base support 180 can be placed upon a supporting surface, such as the ground, to support the structure via the joint assembly 175. This also provides for the use of a dampener 185 with the base support 180 to dampen vibration due to external loads to the structure.

FIGS. 5A to 5C show an alternative arrangement of the joint assembly. Here, the joint assembly 195 is constructed in the same manner as that of FIG. 2A with a primary insert 205 and a secondary insert 200. The joint assembly 195 further includes other inserts, all of which are sequentially placed so as to fix the inserts with the final coupling pin holding the inserts in place.

Where the embodiment of FIGS. 5A to 5C varies from those of FIGS. 2A to 2G is in the final configuration. For the embodiment of FIGS. 2A to 2G, once the inserts are in place the mounts for each insert project from the insert receiving face. To provide structural support for the projected mounts each insert includes at least a pair of braces 17 with the primary and secondary inserts having four and the remaining inserts having two each. For the embodiments of FIGS. 5A to 5C the inserts fit flushed with the insert receiving face leaving the joint assembly 195 in the original cube shape of the engagement block.

FIGS. 6A, 6B and 6C show various applications of the joint assembly according to the present invention. In FIG. 6A a frame 215 includes a plurality of joint assemblies 220 connected together with members 225. To demonstrate the diversity of uses of the joint assembly the structure 215 of FIG. 6A may be a simple shelf or wine rack. This is compared to the embodiments of FIG. 6B where the joint assembly is used as a joint 230 for structural members at a point of intersection or to provide a hanging member within flooring 235. Equally, the joint assembly may be used for the construction of roof trusses, space frames and scaffolding which may be permanent and so benefitting from the rapid engagement of the inserts or temporary structures having the quick release benefit of removing the coupling pin. FIG. 6C shows a frame 216 in the shape of a cube to demonstrate the manner in which the joint assembly according to the present invention can form structural frames such as a space frame, scaffolding or a truss.

The embodiment of FIGS. 7A to 7C is a similar embodiment to that of FIG. 1 demonstrating the structural support for the projecting mounts in each of the inserts 245, 250, 255 of the joint assembly 240.

In a still further embodiment FIGS. 8A to 8C show a mount projecting embodiment of the joint assembly 260 having primary 265 and secondary 270 inserts. However, in this embodiment the coupling pin 275 and connector 280 are not integral with the inserts 265, 270 but are separate elements inserted last. The head of the coupling pin 275 and connector 280 provide a means of fixing the primary and secondary inserts in place as well as providing mounts for connection to external members. Thus, it is demonstrated that within the present invention a coupling pin is not necessarily integral with the inserts but can be provided as an external separate element.

FIGS. 9A to 9C show an alternative embodiment whereby the engagement block 290 is in a purpose built shape so as to fit a specific application. In this case, the engagement block 290 is arranged to be used for a gable roof and so having two inclined upper surfaces 292 for supporting, for instance, roof sheeting. The engagement block 290 includes three insert receiving faces 294, 295, 302 into which inserts may be placed and so have corresponding apertures 298, 300 and slots 260, 296 for receiving the lateral projections, or ribs. In this arrangement the lower surface 294 may receive a primary insert which may connect with the engagement block such that the connector is integral with the engagement block. The couplings of the other inserts may have sufficient tolerance to accommodate the inclined angle into which they fit or alternatively are shaped to receive the coupling pin inserted through aperture 298.

Figure 10A:
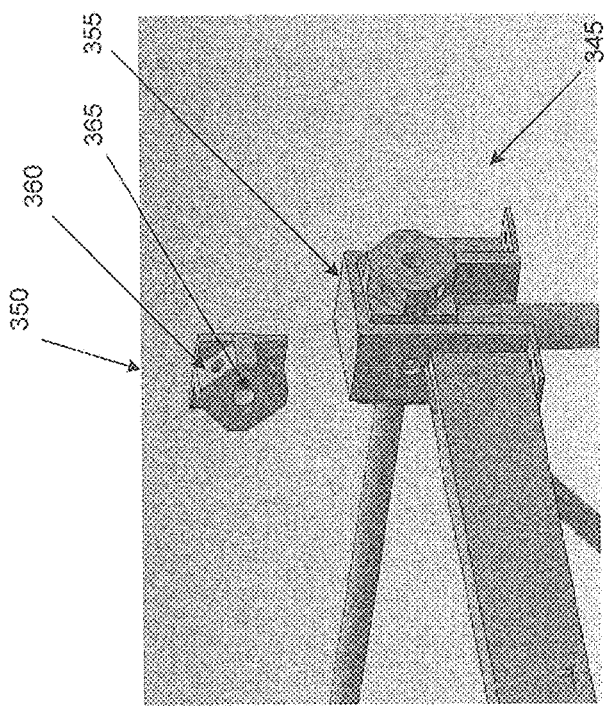
FIGS. 10A and 10B are various views of accessories according to several embodiments of the present invention.
Figure 10B:
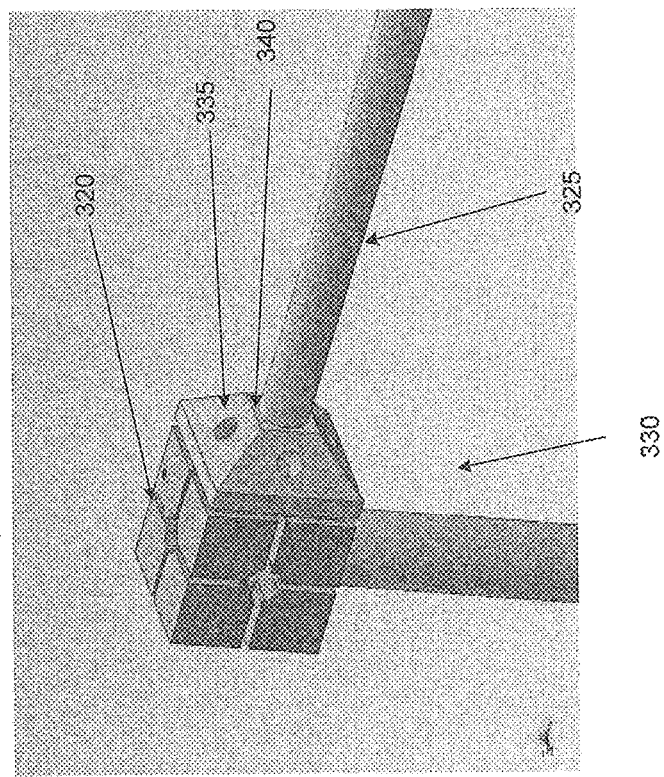

FIGS. 10A and 10B show joints 330, 345 of structures using joint assemblies according to the present invention. In particular, the joint assemblies have accessories to facilitate the connection of members to the joint assemblies not readily available for the engagement block. In some cases, using a generic shaped engagement bock will aid in consistency and manufacturing costs, rather than manufacture engagement blocks of varying shapes. For instance, a cubic shaped engagement block may be preferred. To accommodate members inclined to the insert receiving face of the engagement block, an accessory may be mounted to an insert mount. The accessory, having mounts at various angles, can then allow the attachment of members at a variety of different angles.

For FIG. 10A, the engagement block 320 in this case is cubic. To permit members being to be attached to the engagement block inclined to the insert receiving face, this accessory 335 is frusto-pyramidal, having mounts on each face in which to connect external members. In the present case, a member 325 is connected to one mount 340, allowing 4 other members to be attached to the vacant mounts of the accessory.

For FIG. 10B, one accessory 350 is an octagonal prism, having mounts on four of the side faces 360 and a fifth 365 on a front face. It will be appreciated that a range of different shapes are possible, for instance regular polygonal prism such as triangular, hexagonal etc. here the octagonal prism accessory 350 is mounted to a joint 345.

A second accessory, in this case a bracket 355 is also available, which includes mounts and conventional flanges for attachment to external members.

Figure 11C:
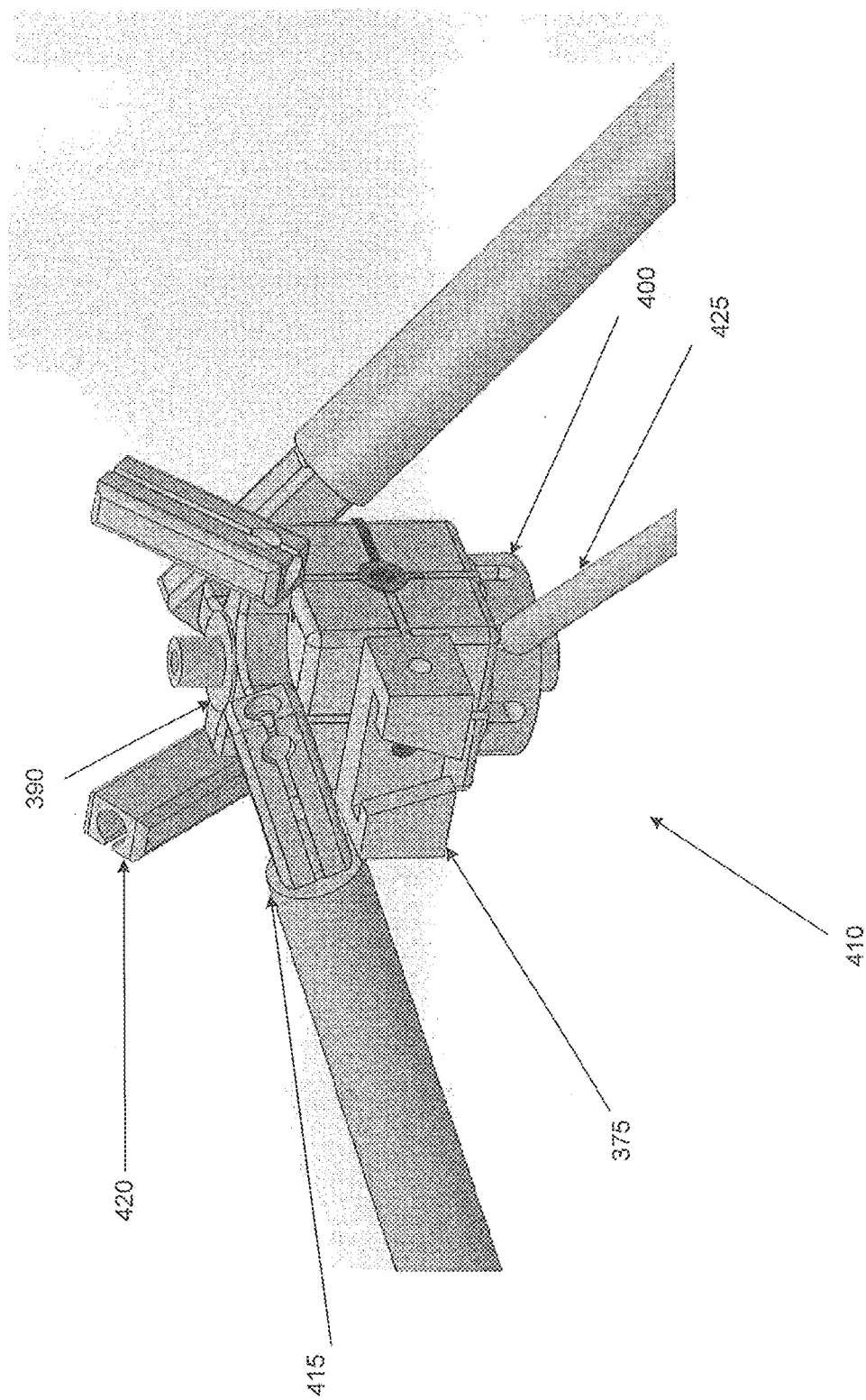

FIGS. 11A to 11C show further accessories. Here a joint assembly 370 includes a locking bracket 375 permitting sliding engagement 380 with an external bracket. It also includes a mount 385 to secure the external bracket. The locking bracket 375 is integrally mounted to an insert for ease of connection with the engagement block.

A second accessory 400, which fits within the secondary insert 405 provides a rotatable section having a plurality of mounts. This rotatable accessory 405 allows infinite incremental rotation so as to correctly align with an external member entering from any angle. This, unlike the accessories of FIGS. 10A and 10B, the rotatable accessory is not confined to a discrete number of mounting angles, but can be adjusted by rotating about the longitudinal axis of the connector to the correct angle. To accommodate other angle, rotatable accessories may be fitted to other insert receiving faces so as to allow rotation about all three primary axes.

A third accessory 390 is similar to that of the accessories of FIGS. 10A and 10B, in that a fixed number of mounts is provided. The accessory 390 fits over the primary insert and allows a second mount for four of the insert receiving faces where a double connection may be required.

FIG. 11C shows a further joint assembly 410 with the accessories of FIGS. 11A and 11B in use. The third accessory 390 includes a member extension 420 to permit the lateral connection of a member 415 without interfering with the mounts of the engagement block. The rotatable accessory 400 also shows the connection of a member 425.

The invention claimed is:

1. A joint assembly comprising:
   an engagement block having a plurality of insert receiving faces;
   each insert receiving face having a slot, and an aperture at a mid-point of the slot;
   a plurality of inserts each having a core, at least a pair of ribs projecting from the core, a coupling at an insertion end of the core and a mount at a mounting end of the core;
   a coupling pin; and
   wherein the engagement block is arranged to receive the inserts, with the ribs received into the slots and the cores received into the apertures, the coupling pin arranged to be inserted into the engagement block and couple with the couplings of the inserts so as to releasably fix the inserts to the engagement block.

2. The joint assembly according to claim 1, wherein the inserts include tips having inclined surfaces, such that the inserts contact adjacent inserts at the inclined surfaces.

3. The joint assembly according to claim 1, further including a primary insert, the primary insert including the coupling pin integrally formed to a core having at least a pair of ribs and a mount.

4. The joint assembly according to claim 1, wherein the mounts are arranged to receive members through any one or a combination of a screw thread, snap fitting or bayonet fitting.

5. The joint assembly according to claim 1, wherein the inserts include four ribs equi-spaced about the core.

6. The joint assembly according to claim 1, wherein on insertion, the inserts are flush with the respective insert receiving faces.

7. The joint assembly according to claim 1, wherein on insertion, the mounts project from the respective insert receiving faces.

8. The joint assembly according to claim 1, further including a connector for receiving an insertion end of the coupling pin.

9. The joint assembly according to claim 3, further including a secondary insert, the secondary insert including the connector integrally formed to a core having at least a pair of ribs and a mount.

10. The joint assembly according to claim 1, further including a locking pin for insertion into the engagement block and through a hole in a rib of one of the inserts.

11. The joint assembly according to claim 1, further including at least one accessory mounted to a mount of at least one insert, the accessory having at least one mount for receiving an external member.

12. The joint assembly according to claim 11, wherein the accessory includes a plurality of mounts, each mount having a longitudinal axis different from the other mounts and arranged to receive members along the respective axis.

13. The joint assembly according to claim 11, wherein each of the accessory mounts arranged on a face of the accessory, the accessory having a frusto-pyramidal shape or regular polygonal prism.

14. The joint assembly according to claim 1, further including a base support for mounting to a respective mount, the base support arranged to support the engagement block on a supporting surface.

15. The joint assembly according to claim 14, wherein the base support includes a damper for dampening vibration forces applied to the supported engagement block.

16. The joint assembly according to claim 1, wherein the engagement block is a cube.

17. A structure comprising a plurality of joint assemblies according to claim 1, the joint assemblies connected by members mounted to the mounts.

18. The structure according to claim 17, further including at least one base support for mounting to a mount of a respective engagement block, the base support arranged to support the engagement block on a supporting surface.

19. The structure according to claim 18, wherein the base support includes a damper for dampening vibration forces applied to the structure.

20. The joint assembly according to claim 2, further including a locking pin for insertion into the engagement block and through a hole in a rib of one of the inserts.

* * * * *